June 27, 1967     A. M. ROSCHER ET AL     3,328,383
PROCESS FOR MAKING GLASS FIBER MATS
Filed Nov. 25, 1964
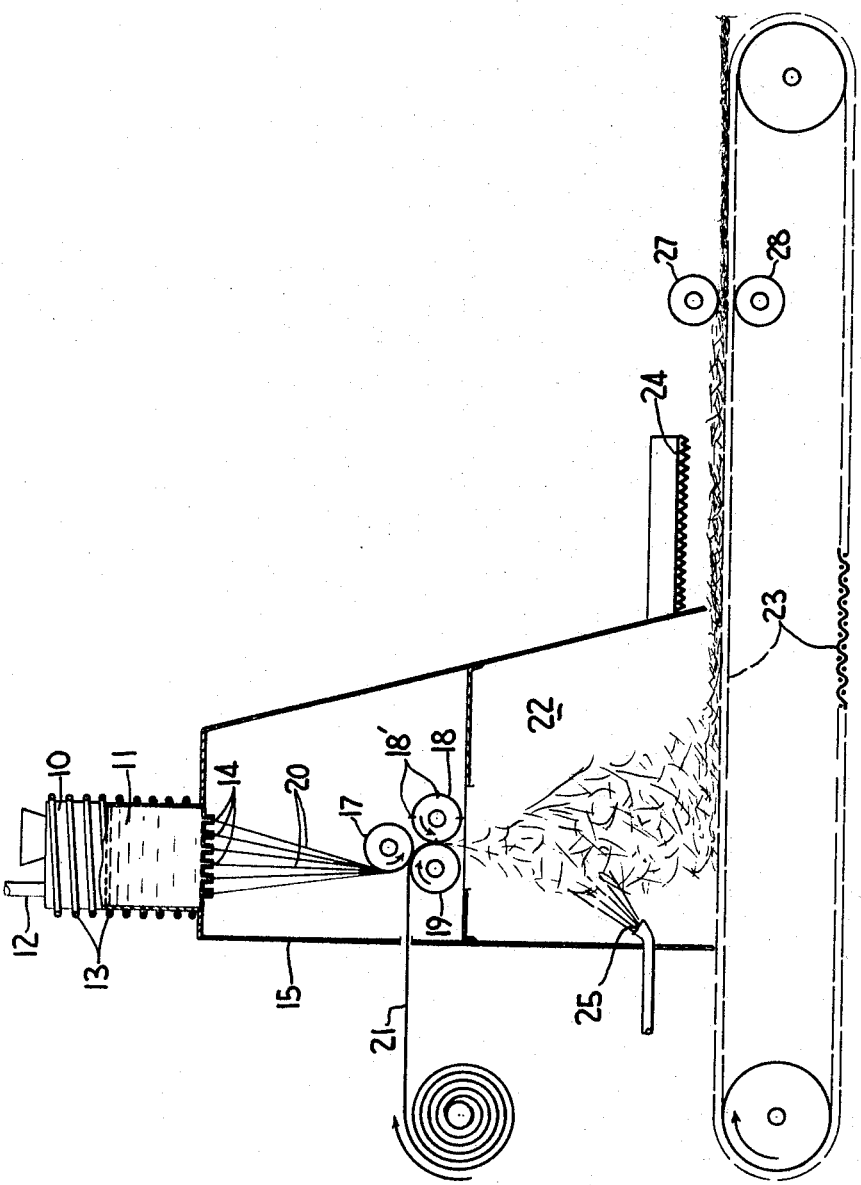
INVENTORS
ALFRED M. ROSCHER and
EDWARD J. POTKANOWICZ
BY
ATTORNEYS

United States Patent Office 3,328,383
Patented June 27, 1967

3,328,383
PROCESS FOR MAKING GLASS FIBER MATS
Alfred M. Roscher, Allison Park, and Edward J. Potkanowicz, Apollo, Pa., assignors to Pittsburgh Plate Glass Company, Pittsburgh, Pa., a corporation of Pennsylvania
Filed Nov. 25, 1964, Ser. No. 413,909
4 Claims. (Cl. 264—115)

This invention is concerned with a process of making and simultaneously distributing a uniform layer of intermeshed glass fibers and thermoplastic synthetic resin filaments. More particularly, this invention relates to a process for making glass fiber mats in which the binder is uniformly distributed throughout the intermeshed fibers of the mat.

The use of resinous compositions to bind together glass fibers in the production of glass fiber mats and preforms is well known. Such mats or preforms are generally composed of glass fibers, which may be continuous or chopped strands, impregnated throughout with various synthetic resin binders. The impregnation may be accomplished through various known processes. Some of the more widely used processes involve spraying glass fibers with a resinous material either before, after or during the distribution of the fibers in mat form. A mat of this type may be prepared, for instance, by introducing glass fibers into a chopping mechanism where they are chopped, and deposited therefrom onto screens or molds, and subsequently sprayed with a synthetic resin binder which may be in liquid or powder form. The use of a powdered binder has been found to be particularly inefficient in that a substantial portion (i.e., about 50 percent) of the binder passes through the mat and is wasted. Moreover, processes of this type result in non-uniform distribution of resin with the result that the product is not completely impregnated. Such a product is unsuitable because the fibers tend to separate from or otherwise work loose from the mat.

Attempts to remedy this problem have led to the development of preformed mats which are composed of natural and/or synthetic fibers intermeshed with synthetic resin filaments. However, satisfactory procedures for handling and uniformly distributing the fibers and binder filaments in mat form have not been successfully developed. Difficulties have been encountered in the processes which are used to distribute the binder filaments uniformly with the glass fibers. For example, when the binder filament is placed on a spool prior to use or unwound therefrom in use, the filaments may break. Frequently, binder filaments which can be wound on spools without breaking are not easily chopped or severed by the same choppers conventionally used to chop or sever glass fiber strands.

One of the objects of the present invention is to provide a novel process of forming a resin-bound glass fiber mat in which the binder is uniformly distributed through the glass fibers.

Another object of the present invention is to provide a novel process of making and simultaneously distributing a uniform layer of intermeshed glass fibers and thermoplastic synthetic resin filaments.

The foregoing objects of this invention are accomplished and the disadvantages of the prior art overcome by the practice of this invention which, briefly, comprises the steps of forming thermoplastic binder filaments that are readily chopped or severed and immediately thereafter simultaneously and in one step severing and uniformly distributing both the binder filaments and the glass fibers to form an intermeshed mat and subsequently heating the mat to a temperature sufficient for the filamentary binder material to bond the glass fibers. In a preferred embodiment of the invention, the binder filaments and glass fiber strands are combined and simultaneously chopped and distributed in intermingled fashion to a foraminous collecting device. The mat thus formed overcomes the previously mentioned disadvantages in that there is no necessity for handling low melting thermoplastic organic liquids, powders or spools of previously made continuous filaments. Such mats have good mechanical strength and stability and the amount of binder can be accurately controlled without loss such as occurs when using a powdered or liquid binder.

In the practice of this invention, thermoplastic resin binder filaments are extruded from a bushing, rapidly hardened and immediately fed simultaneously together with glass fiber strands from roving, or the like, directly into a chopping or other disjoining mechanism. The simultaneously chopping of the filaments and fibers causes the filaments and fibers to be uniformly distributed and intermixed as they are collected either as mats or preforms. The distribution may be enhanced through the use of suitable air streams introduced at appropriate places. In order to accomplish the disjoining operation effectively, the thermoplastic resin filaments must be sufficiently frangile or brittle that the disjoining mechanism does not become fouled or clogged during this operation, but not so frangible or brittle that they will break prior to entering the disjoining mechanism.

The synthetic resin binder filaments which may be used in the practice of this invention are the low melting thermoplastic resins which rapidly harden to form frangible filaments. Such resins must me heat stable and compatible with other resins that may be used to impregnate the bonded mat or preform. One of the resins which possesses the foregoing characteristic is sold by the Atlas Powder Company under the trademark of ATLAC SFB-3. This thermoplastic is a polyester resin which has a ball and ring softening point of 95° C. The invention is not limited, however, to this particular resin since other resins possessing the foregoing characteristics may be obtained by conventional techniques. For example, a suitable resin which may be used is obtained by reacting a polyol such as glycerol with a dicarboxylic acid such as phthalic acid. By stopping the reaction short of the gel point there is obtained a suitable glycerol phthalate resin. Such a resin is saturated, transparent, fusible, hard and somewhat brittle. Polyvinyl acetate may also be used in the practice of this invention.

The resin-bound fiber glass mats and preforms of this invention are advantageously used in the production of numerous products. The fibrous products can be impregnated and molded with compatible thermosetting resins such as styrenated polyesters and epoxy resins, the condensates of phenol-formaldehyde, urea-formaldehyde, melamine-formaldehyde, etc. The fibrous products can be used in non-molded products such as filters for various gases and liquids, insulation materials, and other articles.

The glass fiber roving which can be used in the practice of the present invention can be formed by conventional methods. One method which can be used in forming the glass roving includes flowing fine streams of molten glass from a perforated bushing, attenuating the molten streams to fine continuous fibers and gathering the fibers into a strand. A plurality of strands are combined in parallel relation to form roving. The strands are usually coated with a size containing a binder, a lubricant and a coupling agent as essential ingredients by applying it to the individual fibers prior to their being grouped into a strand during the forming operation.

The aspects of this invention which are capable of illustration are shown in the accompanying drawing.

The drawing is a partial cross-sectional elevation view of an apparatus used in carrying out the process of this invention.

In the drawing, there is provided a frame 15 supporting the binder melting bushing 10 which is installed about 2½ feet above the chopping mechanism 18. A thermoplastic resin binder 11, which has the required characteristics as set forth above, such as ATLAC SFB-3 is fed into the bushing 10 in large pieces and heated to a melting temperature by heating elements 13 and allowed to cool to a suitable drawing temperature. At such drawing temperatures, the resin 11 flows through the orifice plate holes 14 at the bottom of the bushing 10. A pressure of 5-25 p.s.i. is maintained on the resin 11 to control its flow. This is done by regulating the flow of a stream of inert gas through the pressure inlet 12 mounted in the bushing 10. The formed filaments 20 cool and harden rapidly as they issue from the bushing. At this point, the filaments 20 are immediately fed jointly with the glass fiber roving 21 between the pressure rollers 17 and 19, and into the disjoining mechanism 18 which simultaneously severs both the glass fibers and the synthetic resin binder filaments. The severing mechanism may be provided with a series of blades such as 18', or it may be of the type that severs by means of a pulling or snubbing action. The chopped fibers and filaments form a mixture thereof comprising 2-15 percent by weight of resin binder. The mixture is uniformly dispersed in the chamber 22 by the action of the chopper and the air stream 25 and collected on the conveyor screen 23 to form the mat.

The mat is then heated by a suitable heating means 24 as it is withdrawn from the chamber 22 to soften the binder. Heat softening the binder imparts random bonding between the glass fibers at their points of intersection. In addition to the heat softening operation, the mat may subsequently be pressed by the application of pressure through the rolls 27 and 28. The pressing procedure is employed after the heat softening operation in order to set the glass fibers and resin binder and thereby achieve the desired strength. The temperature should merely be sufficient to cause the resinous material to bond the glass fibers. Overheating at higher temperatures can result in the thermal decomposition of the thermoplastic resin binder, resulting in undesirable loss of mat strength.

The conveyor 23 may be driven by any suitable means (not shown) which synchronize the movement of the conveyor screen 23 with respect to the chopping mechanism 18.

It is to be understood that other equivalent means may be utilized in lieu of the conveyor 23 to form the mat. For instance, the fibers and filaments may be deposited or collected on various shaped screens to produce preform configurations.

The following example is illustrative of the invention and in no way should be construed as limitations thereon.

*Example*

A binder is prepared by introducing chunks or large pieces of ATLAC SFB-3 into a binder filamentizing bushing as shown in the figure. ATLAC SFB-3 is a polyester resin which has a ball and ring softening point of 95° C. The binder is maintained under inert gas pressure of 10 p.s.i. and heated to a temperature of 150° C. to remove any entrained air bubbles and then allowed to cool to a fiber drawing temperature of 120° C. As the filaments issue from the bushing, they are rapidly cooled to form somewhat frangible filaments which are immediately fed simultaneously with glass fiber strands in the form of 60 end roving directly into the chopper. The weight ratio of glass fiber to resin filament is about 10 to 1. As the fibers and filaments are chopped, they are uniformly dispersed by the action of the chopper and the introduction of a mixing air stream. The uniformly dispersed mixture is collected on a conveyor screen and subsequently heated to soften the filamentary resinous material. Pressure is then applied to more intimately bond the mat together.

The method according to this invention provides a novel process of forming an intimately dispersed uniform mixture of thermoplastic resin filaments and glass fibers in which the filamentary resinous material is heat softened to impart random bonding between the glass fibers at their points of intersection. This process avoids the inefficient processes previously used.

It is to be further understood that the form of the invention herewith shown and described is to be taken as a preferred embodiment of the same, but that various modifications may be resorted to without departing from the spirit of the invention.

We claim:
1. A process comprising forming substantially brittle thermoplastic synthetic resin filaments and immediately thereafter bringing glass fibers and said filaments into intimate association, introducing said fibers and said filaments simultaneously and in one step into a disjoining mechanism, simultaneously disjoining and collecting said disjoined fibers and filaments in an intermeshed, intersecting, substantially uniformly dispersed relation and subsequently heat softening said filaments to bind said fibers at random said points of intersection.

2. A process of forming a fibrous mat, preform, and the like composed of uniformly dispersed glass fibers and thermoplastic resin binder, comprising the steps of forming substantially brittle thermoplastic resin filaments, immediately thereafter bringing said fibers and filaments into intimate association, introducing said fibers and filaments simultaneously and in one step into a chopping mechanism, simultaneously chopping and dispersing said chopped fibers and filaments to form a uniform, intermeshed, intersecting mixture thereof, collecting said mixture and subsequently heat softening said filaments to bind said fibers at random said points of intersection.

3. The process as set forth in claim 2 which includes the step of pressing said mat while maintaining said thermoplastic resin in a heat softened condition.

4. The process as set forth in claim 2 wherein said thermoplastic resin filament is a polyester having a ball and ring softening point of about 95° C.

References Cited

UNITED STATES PATENTS

| | | | |
|---|---|---|---|
| 2,356,826 | 8/1944 | Coss et al. | 264—122 |
| 2,483,406 | 10/1949 | Francis | 264—122 |
| 2,544,019 | 3/1951 | Heritage | 264—122 |

ROBERT F. WHITE, *Primary Examiner.*

J. R. HALL, *Assistant Examiner.*